Nov. 25, 1958   H. J. PROXMIRE ET AL   2,862,043
BUSHING SUPPORT FOR ELECTRICAL APPARATUS
Filed Feb. 27, 1957
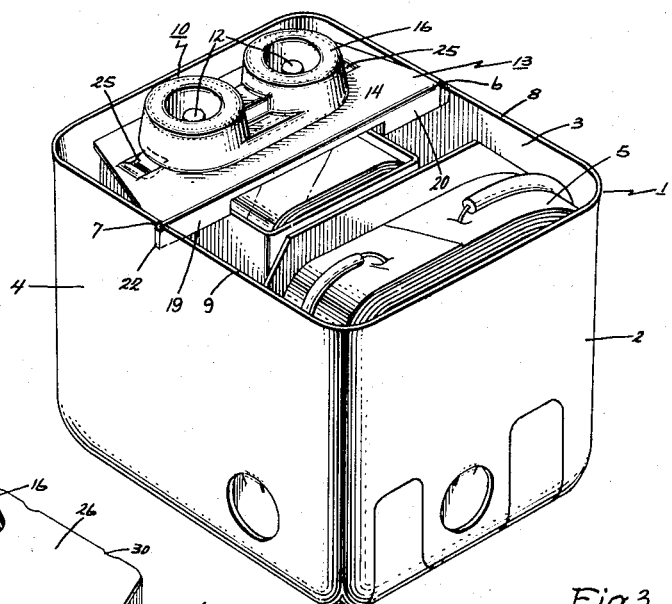
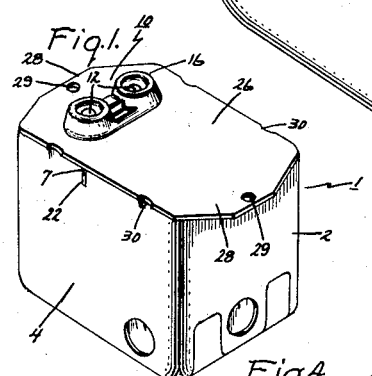
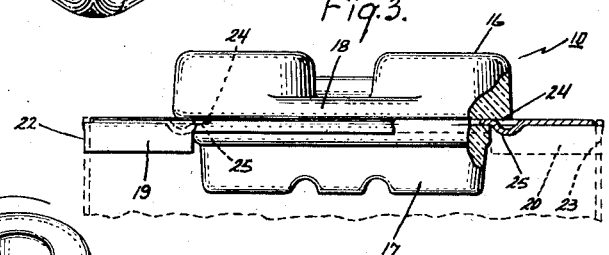
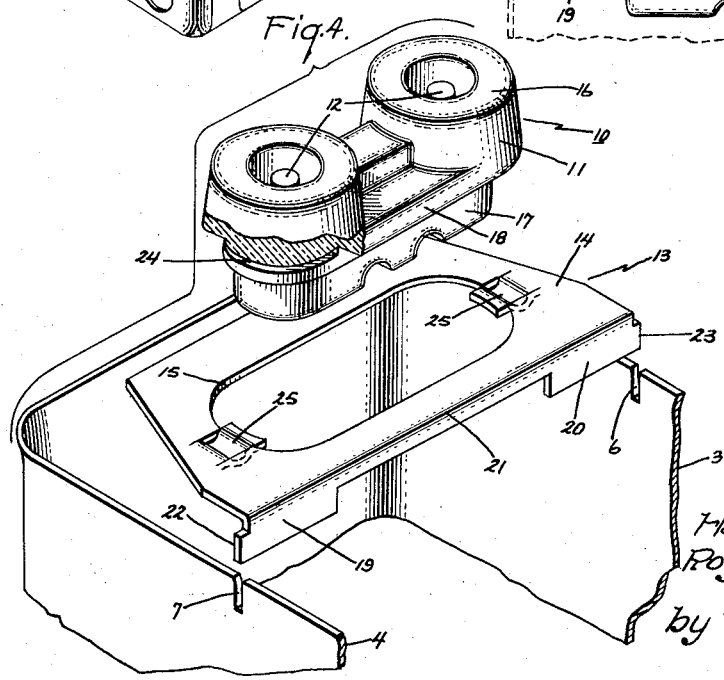
Inventors:
Harry J. Proxmire,
Roy H. Dierstein,
by Robert G. Irish
Their Attorney.

United States Patent Office 2,862,043
Patented Nov. 25, 1958

2,862,043

BUSHING SUPPORT FOR ELECTRICAL APPARATUS

Harry J. Proxmire and Roy H. Dierstein, Fort Wayne, Ind., assignors to General Electric Company, a corporation of New York Application February 27, 1957, Serial No. 642,796

5 Claims. (Cl. 174—152)

This invention relates to electrical apparatus of the type having an enclosing case and a bushing for making external electrical connections to the apparatus and more particularly to an improved support for the bushing in such apparatus.

Certain electrical apparatus, such as ignition transformers for oil burners, includes an enclosing case and a high voltage bushing for making external high voltage electrical connections to the apparatus; in an ignition transformer the bushing serves to connect the high voltage secondary winding of the transformer to the oil burner electrodes. In the case of ignition transformers, it has been the practice in the past to support the bushing in the open end of the case by means of a generally U-shaped bracket which spans the open end of the case and is attached to opposite side walls thereof by screws; the cover or base member closes the open end of the case and has an opening therein through which the bushing projects. The assembly of the prior bushing support bracket in the case by means of screws involved a hand operation and thus added appreciably to the overall cost of the device. In addition, the bushing itself was retained in the bushing support bracket by means of a retaining pin, the manual insertion of which added still further to the overall cost of the device. It is therefore desirable to provide an arrangement in which the bushing support bracket can be readily positioned and held in assembled relation without the use of screws or other auxiliary fastening devices and in which the bushing can in turn be held in assembled relation on the bushing support bracket without requiring the use of retaining devices such as pins.

It is therefore an object of this invention to provide an improved bushing support arrangement for electrical apparatus, incorporating the desirable features set forth above.

Further objects and advantages of this invention will become apparent by reference to the following description and the accompanying drawing, and the features of novelty which characterize this invention will be pointed out with particularity in the claims annexed to and forming a part of this specification.

This invention in one of its aspects provides a casing member for electrical apparatus having an open end with two opposite side walls having a pair of transversely aligned openings respectively formed therein. A bushing support bracket is provided having a portion adapted to engage the bushing with a pair of projections respectively extending therefrom in a plane generally perpendicular to the plane of the bushing engaging portion. An electrical bushing is provided for making external electrical connections to the apparatus and is engaged by the bracket member. The bracket is positioned with the projections respectively seated in the side wall openings thereby providing a cantilever support for the bushing in the open end of the casing. In the preferred embodiment of this invention, the bushing engaging portion of the bracket has an opening in which the bushing is seated and further has tab means formed thereon adjacent the opening which engage a slot formed in the bushing thereby retaining the bushing in the opening without the use of auxiliary fastening or retaining devices.

In the drawing:

Fig. 1 is a view in perspective showing an oil burner ignition transformer incorporating the improved construction of this invention with the base assembled on the case;

Fig. 2 is a view in perspective showing the ignition transformer of Fig. 1 with the base removed;

Fig. 3 is a fragmentary end view, partly in section showing the improved bushing support bracket and bushing retaining means of this invention; and Fig. 4 is a fragmentary exploded view further showing the improved bushing support arrangement of this invention.

Referring now to the figures of the drawing, the ignition transformer 1 includes a casing 2 having side walls 3 and 4. A transformer core and coil assembly 5, for example of the type shown in Patent 2,114,189 to C. W. Kronmiller, and assigned to the assignee of the present application, is shown positioned within the casing 2, it being understood that the specific electrical apparatus enclosed in the casing 2 does not form a part of this invention and is shown here for illustrative purposes only. A pair of slots 6 and 7 are respectively formed in the edges 8 and 9 of side walls 3 and 4 and are generally perpendicular thereto.

A high voltage electrical bushing 10 having a body portion 11 formed of suitable material, such as porcelain and a pair of electrical terminals 12 is provided, it again being understood that the specific form of bushing does not constitute a part of this invention. The bushing assembly 10 is utilized for making external high voltage electrical connections to the apparatus housed in the case 2 by means of suitable internal leads (not shown). In order to support the bushing assembly 10, a bushing support bracket 13 is provided having a portion 14 with an opening 15 formed therein. It will be seen that the body portion 11 of bushing 10 has an upper portion 16 and a lower portion 17 which is smaller than the upper portion 16, the upper portion 16 defining a rim 18. The lower portion 17 of bushing assembly 10 is seated in and projects through opening 15 in portion 14 of bushing support bracket 13 with the rim portion 18 abutting the upper surface of portion 14.

Portion 14 of bushing support bracket 13 has a pair of spaced apart portions 19 and 20 depending from its edge 21 and generally perpendicular thereto, the portions 19 and 20 respectively having projections 22 and 23 formed on their side edges.

Bushing support bracket 13 is positioned spanning the open end of case 2 with projections 22 and 23 respectively seated in slots 7 and 6 of side walls 4 and 3 of the case 2. It will now be seen that with this arrangement, bushing 10 is supported by portion 14 of bushing support bracket 13 in the manner of a cantilever with the lower portion 17 being within casing 2 and the upper portion 16 projecting outwardly therefrom.

In order to retain bushing assembly 10 in the opening 15 in portion 14 of bushing support 13, peripheral grooves 24 are formed in the opposite ends of lower portion 17 of body portion 11 immediately under the rim 18 and a pair of spring tabs 25 are respectively formed from portion 14 of bushing support bracket on opposite sides of opening 15. It will be seen that when the lower portion 17 of bushing assembly 10 is inserted in opening 15, the tabs 25 will spring into engagement with grooves 24, as best seen in Fig. 3, thereby retaining bushing assembly 10 in the opening 15 in bushing support bracket 13.

The assembly of the transformer 1 is completed by positioning a base member 26 on case 2 closing the open end thereof, the base member 26 having an opening 27 formed therein through which the upper portion 16 of bushing assembly 10 projects. Base 26 is provided with suitable extensions 28 having openings 29 formed therein for mounting the transformer 1. Base 26 is attached to the case 2 in any suitable manner, for example by crimping in several locations as at 30.

It will now be seen that this invention provides a bushing support arrangement for electrical apparatus which may be quickly and readily assembled on the casing of the apparatus without the use of screws or other auxiliary fastening devices and further which retains the bushing in place without the use of pins or other retaining devices.

While we have illustrated and described a specific embodiment of this invention, further modifications and improvements will occur to those skilled in the art and we desire that it be understood therefore, that this invention is not limited to the specific form shown and we intend in the appended claims to cover all modifications which do not depart from the spirit and scope of this invention.

What we claim as new and desire to secure by Letters Patent of the United States is:

1. In electrical apparatus: a casing member having an open end with opposite side walls having a pair of transversely aligned openings respectively formed therein; an electrical bushing for making external electrical connections to said apparatus; and a bushing support bracket member having a generally L-shaped cross-section, one leg portion of said bracket member having a pair of extension portions respectively seated in said wall openings and the other leg portion engaging said bushing and providing cantilever support therefor in said casing member open end.

2. In electrical apparatus: a casing member having an open end with two opposite side walls having a pair of transversely aligned openings respectively formed therein; a bushing support bracket member having a generally L-shaped cross-section, one leg portion of said bracket member defining an opening, the other leg portion of said bracket member having a pair of projections respectively extending from opposite ends thereof; and an electrical bushing for making external electrical connections to said apparatus seated in said one leg portion opening; said bracket member being positioned with said projections respectively seated in said side wall openings thereby providing cantilever support for said bushing in said casing member open end.

3. In electrical apparatus: a casing member having a open end with two opposite side walls having a pair of transversely aligned openings respectively formed therein; a bushing support bracket member having a generally L-shaped cross-section, one leg portion of said bracket member having an opening formed therein, the other leg portion of said bracket member having a cut-out portion intermediate its ends with projections respectively formed on said ends; and an electrical bushing for making external electrical connections to said apparatus seated in said one leg portion opening, said first leg portion having means for retaining said bushing in said bracket member opening; said bracket member being positioned spanning said casing member open end with said projections being respectively seated in said side wall openings thereby providing cantilever support for said bushing in said casing member open end.

4. In electrical apparatus: a casing member having an open end with two opposite side walls having a pair of transversely aligned slots respectively formed in and generally perpendicular to the edges thereof; a bushing support bracket member having a generally L-shaped cross-section, one leg portion of said bracket member being substantially wider than the other leg and having an opening formed therein, the other leg portion of said bracket member having a cut-out portion intermediate its ends with projections respectively formed on said ends; and an electrical bushing for making external electrical connections to said apparatus seated in said one leg portion opening, said first leg portion having means for retaining said bushing in said bracket member opening; said bracket member being positioned in and spanning said casing member open end with said projections being respectively seated in said side wall slots thereby providing cantilever support for said bushing in said casing member open end.

5. In electrical apparatus: a casing member having an open end with two opposite side walls having a pair of transversely aligned slots respectively formed in and generally perpendicular to the edges thereof; a bushing support bracket member having a generally L-shaped cross-section, one leg portion of said bracket member being substantially wider than the other leg and having an opening formed therein, the other leg portion of said bracket member having a cut-out portion intermediate its ends with projections respectively formed on said ends; and an electrical bushing for making external electrical connections to said apparatus seated in said one leg portion opening, said bushing having a slot extending around at least a part of its periphery, said first leg portion having at least one spring tab formed therefrom adjacent said opening and seated in said bushing slot thereby retaining said bushing in said opening; said bracket member being positioned in and spanning said casing member open end with said projections being respectively seated in said side wall slots thereby providing cantilever support for said bushing in said casing member open end.

References Cited in the file of this patent

UNITED STATES PATENTS

| | | |
|---|---|---|
| 1,844,511 | Kiffe | Feb. 9, 1932 |
| 2,462,622 | Farrow | Feb. 22, 1949 |
| 2,798,271 | Flora | July 9, 1957 |